May 17, 1932.  C. WALES  1,859,011
METHOD OF AND APPARATUS FOR MAKING GLASS ARTICLES
Filed Feb. 6, 1929   2 Sheets-Sheet 1
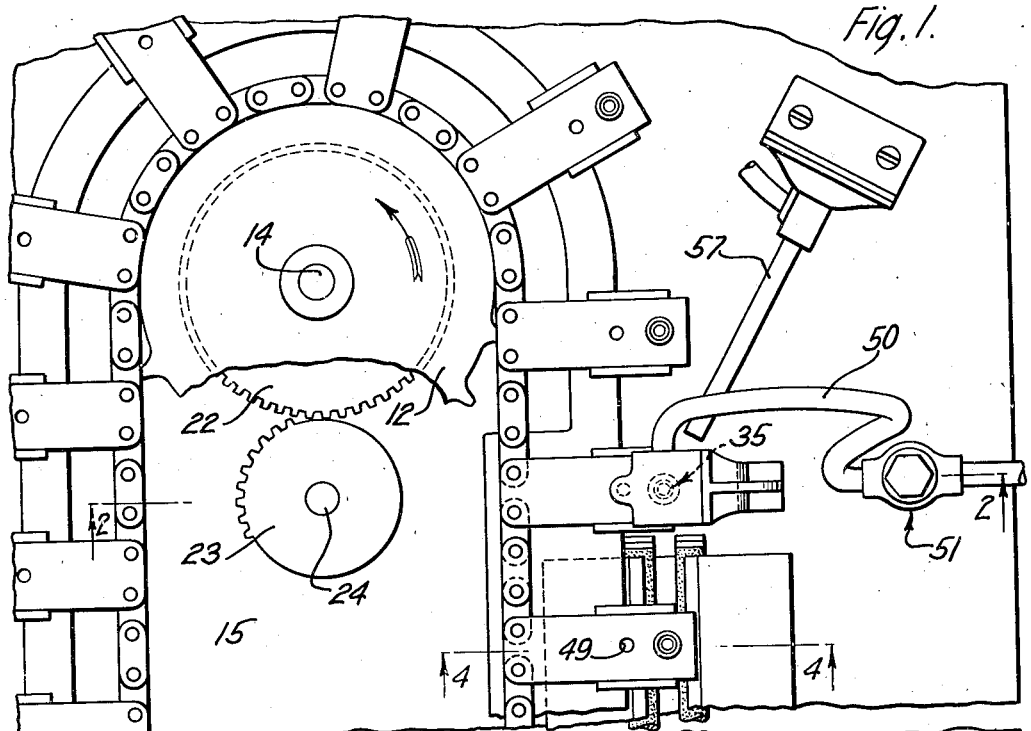
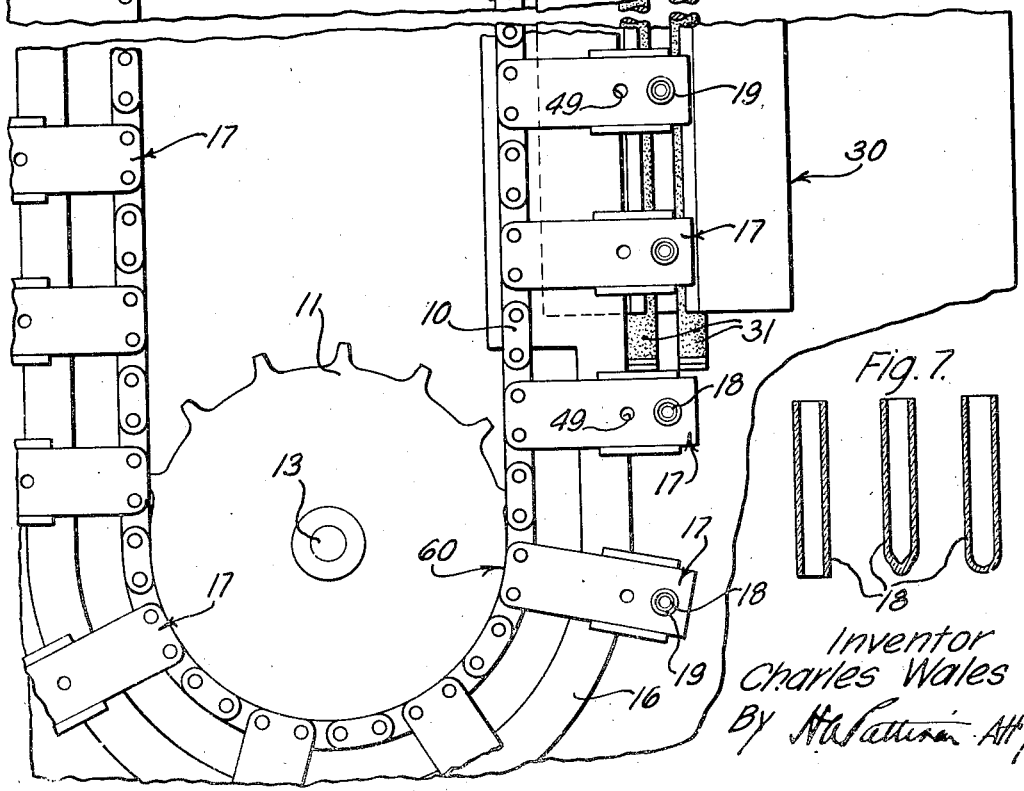
Inventor
Charles Wales

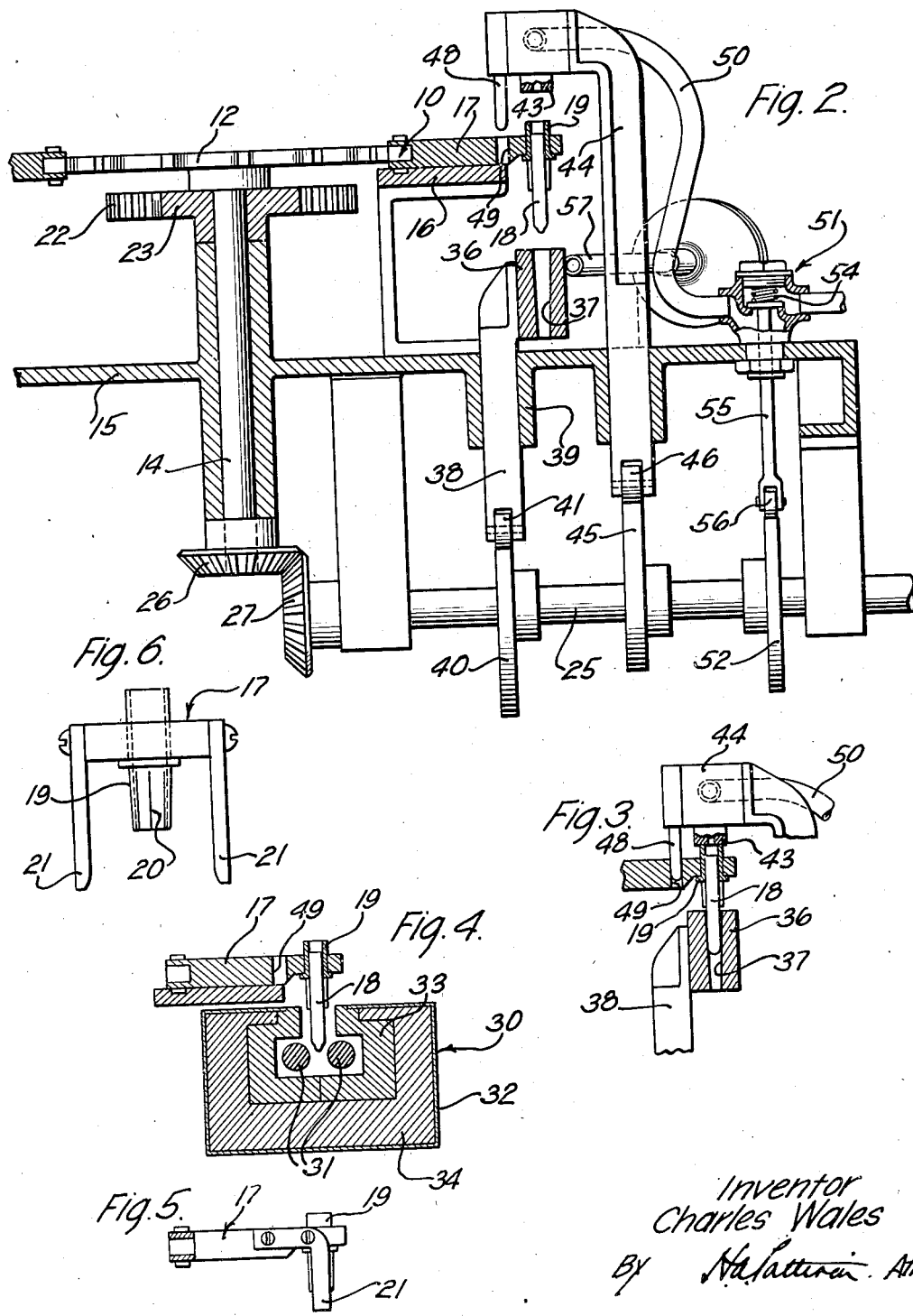

Patented May 17, 1932

1,859,011

UNITED STATES PATENT OFFICE

CHARLES WALES, OF LA GRANGE, ILLINOIS, ASSIGNOR TO WESTERN ELECTRIC COMPANY, INCORPORATED, OF NEW YORK, N. Y., A CORPORATION OF NEW YORK

METHOD OF AND APPARATUS FOR MAKING GLASS ARTICLES

Application filed February 6, 1929. Serial No. 337,763.

This invention relates to methods of and apparatus for making glass articles, and more particularly to methods of and apparatus for forming bulbs for incandescent lamps.

Objects of the present invention are to provide an economical and efficient method of and apparatus for expeditiously producing, from glass tubes, bulbs of improved and uniform character.

The invention contemplates the provision of a method of and apparatus for producing lamp bulbs from individual predetermined lengths of glass tubing. In accordance with one embodiment of the invention, an endless conveyor chain is provided for progressively advancing the tubes through a furnace wherein an end portion of each tube is heated to a plastic state, causing the wall of the tube to collapse or be attracted inwardly, thus closing the lower end of the tube and forming a globule of molten glass on the end of the tube. After each tube, thus heated, emerges from the furnace, a vertically reciprocable member having a cylindrical bore of slightly larger diameter than the tube is moved upwardly to a position wherein it encircles the closed lower end portion of the tube and simultaneously therewith the upper open end of the tube is connected to a source of air under predetermined pressure whereby the closed plastic end of the tube is distended, thus thinning out the globule of molten glass by surface tension. The diameter of the distended portion is confined to the same diameter as the tube by the cylindrical bore of the vertically reciprocable member, the latter being heated to a constant predetermined temperature to maintain the closed lower end portion of the tube in a plastic state during the application of air pressure.

A more complete understanding of the invention will be had from the following detailed description of a preferred embodiment thereof, reference being had to the accompanying drawings, wherein Fig. 1 is a diagrammatic plan view, partly broken away, of an apparatus embodying the features of the invention and by means of which the improved method may be practiced;

Fig. 2 is a fragmentary vertical section taken on line 2—2 of Fig. 1;

Fig. 3 is a fragmentary detail section of a portion of the structure shown in Fig. 2 with the parts shown in their operative positions;

Fig. 4 is a fragmentary detail section taken on line 4—4 of Fig. 1;

Fig. 5 is a side elevational view of one of the tube supporting fixtures;

Fig. 6 is an enlarged front elevation thereof, and

Fig. 7 shows several sectional views of one of the glass tubes, illustrating the several steps in its formation into a bulb for incandescent lamps by the improved method and apparatus.

It is believed that the improved method will be clearly understood from the following description of an apparatus by means of which the method may be practiced. It should be understood, of course, that the method of this invention is not limited to the particular apparatus herein illustrated and described, except insofar as is defined by the appended claims.

Referring now to the drawings wherein like reference numerals designate corresponding parts throughout the several views, it will be observed that an endless conveyor chain indicated generally by the reference numeral 10 is arranged to travel around a pair of spaced sprockets 11 and 12 secured to vertically disposed shafts 13 and 14, respectively, rotataby journaled in a suitable supporting frame 15. Secured to the conveyor chain 10 at equi-distantly spaced positions therealong are a plurality of fixtures 17 adapted to receive and support individual lengths of glass tubing 18. Each of the fixtures 17 is apertured to receive a vertically disposed bushing 19 which extends above and below the upper and lower surfaces, respectively, of the fixture, as shown in Fig. 6. The inside diameter of the upper portion of each bushing 19 is slightly larger than the diameter of the glass tubes 18 whereby the glass tubes may be readily and conveniently inserted therein as will hereinafter be more fully described. The lower portion of each bushing 19 is slit, as indicated at 20, and its inside diameter is slightly smaller than the diameter of the glass tubes whereby, due to the resiliency of the slitted lower portion of the bushing, the tubes are firmly clamped therein upon being inserted through the upper end thereof. Side plates 21, 21 secured on opposite sides of each fixture 17 serve to protect the tubes against objectionable drafts or air currents while heated.

Means is provided for imparting an intermittent motion to the conveyor chain 10 whereby the tube carrying fixtures 17 are intermittently advanced to successive positions upon a horizontal supporting plate 16. Secured to the vertical shaft 14 so as to be rotatable with the sprocket 12 is a gear 22 (Fig. 1) which is driven by a gear 23 secured to a vertically disposed shaft 24. It will be noted that the gear 23 is mutilated so that gear 22 is driven during only a portion of each complete rotation of the gear 23. The construction and arrangement is such that the conveyor chain 10 is advanced a predetermined distance during each complete rotation of the gear 23. The shaft 24 is driven from a cam shaft 25 through a pair of bevel gears 26 and 27 (Fig. 2), and the cam shaft 25 is, in turn, driven from any suitable source of power (not shown). From the construction just described it will be obvious that the gear 23 is intermittently driven from the continuously driven cam shaft 25 and that an intermittent motion is thereby imparted to the conveyor chain 10.

The conveyor chain 10 advances the glass tubes through a furnace 30 which consists of two parallel electrical heating elements 31—31 mounted in a housing 32 lined with suitable insulating material 33 and 34 (Fig. 4). The heating elements 31 are composed of a high electrical and heat resisting material and may be connected in any suitable manner to a source of electrical energy (not shown). As the glass tubes are progressively advanced through the furnace, the lower end portion of each tube is heated to a plastic state causing the wall thereof to collapse or be attracted inwardly, thus closing the lower end of the tube, as shown in Fig. 4.

After leaving the furnace the tubes are progressively advanced to a position indicated by the reference numeral 35 (Fig. 1). While dwelling at this position a vertically reciprocable member 36 (Fig. 2) having a vertically extending bore 37 moves upwardly to the position shown in Fig. 3, wherein it encircles the closed lower end portion of the tube. It will be observed that the upper portion of the bore 37 is slightly larger in diameter than the normal exterior diameter of the glass tube and the diameter of the bore decreases gradually toward the lower portion thereof which is of the same diameter as the tube. The member 36 is carried by a vertically reciprocable bracket 38 which is slidable in a bearing 39 formed in the supporting frame 15. A cam 40 secured to the cam shaft 25 engages a roller 41 carried upon the lower end of the bracket. The cam 40 is designed so that the member 36 is moved upwardly to the position shown in Fig. 3 and returns by gravity to its normal position, thus completing one cycle of operation during each complete rotation of the cam shaft 25.

Simultaneously with the upward move of the member 36, an air nozzle 43 carried by a vertically reciprocable bracket 44 moves downwardly to the position shown in Fig. 3 wherein it engages the upper end of the bushing 19. The lower end of the nozzle 43 is preferably composed of rubber or other resilient material whereby an air tight connection between the nozzle and the bushing 19 is secured. A cam 45 secured to the cam shaft 25 engages a roller 46 carried upon the lower end of the bracket 44. The cam 45 is designed so that the bracket 44 is permitted to move downwardly by gravity to the position shown in Fig. 3 and is moved upwardly by the cam, thus completing one cycle of operation during each complete rotation of the cam shaft 25. A centering pin 48 carried by the bracket 44 is adapted to engage an aperture 49 formed in each of the tube supporting fixtures 17 so as to properly locate the glass tube with respect to the bore 37 and the air nozzle 43.

The air nozzle 43 is connected by a flexible hose 50 to a mechanically operated valve 51 connected to a source of air under constant predetermined pressure (not shown). The valve 51 is operated by a cam 52 secured to the cam shaft 25 and designed so as to open the valve immediately upon the engagement of the nozzle 43 with the upper end of the bushing 19. The valve 51 is normally held closed by a compression spring 54 which bears downwardly upon the upper end of the valve stem 55. A roller 56 carried upon the lower end of the valve stem 55 engages the periphery of the cam 52.

In the operation of the above described apparatus the tube supporting fixtures 17 are intermittently advanced by the conveyor chain 10 to successive positions, dwelling at each position for a predetermined period of time. While dwelling at the position indicated by the reference numeral 60 (Fig. 1) or at a position arrived at previously thereto an individual length of glass tubing 18 is inserted through the upper end of the bushing 19 of each fixture and pressed downwardly so that the upper end of the tube is below the upper end of the bushing and the lower portion of the tube is below the lower end of the bushing. As the tubes are progressively advanced through the furnace 30, the lower end portion of each tube is heated to a molten or plastic state causing the same to collapse or be attracted inwardly, thus closing the lower end of the tube and forming a globule of molten glass on the end of the tube. After leaving the furnace 30 the tubes are progressively advanced to the position 35 (Fig. 1) and while dwelling at this position the member 36 is moved upwardly by the cam 40, the closed lower end portion of the tube entering the bore 37. Simultaneously therewith, the air nozzle 43 is moved downwardly by the cam 45 to the position shown in Fig. 3. Upon arriving at this position the valve 51 is opened by the cam 52 thereby connecting the glass tube to a source of air under predetermined pressure of sufficient strength to lengthen the plastic lower portion of the tube. In practice, satisfactory results have been obtained by the use of an air pressure of about one pound per square inch, although it will be understood that this pressure may be varied within certain limits without departing from the spirit and scope of the invention.

The bore 37 of the member 36 confines the diameter of the finished bulb to the normal outside diameter of the tube, but permits the tube to extend in the direction of its length thus causing the globule of molten glass formed on the closed lower end thereof to spread and extend lengthwise of the tube when the air pressure is applied, forming a transparent and symmetrical hemispherical end on the tube. A flame directed upon the member 36 from a Bunsen burner 57 serves to heat the member 36 so as to prevent chilling of the glass tube when inserted in the bore 37. After air pressure has been applied for a predetermined period of time the valve 51 closes and the air nozzle 43 and member 36 return to their normal or starting positions, as shown in Fig. 2. The finished bulb continues to advance intermittently to successive positions and, after having cooled sufficiently, is removed from its supporting fixture and collected in a suitable receptacle (not shown).

The above described operation is repeated for each individual length of glass tubing as it is intermittently advanced by the conveyor chain. In this manner bulbs of uniform character having transparent and symmetrical hemispherical ends may be expeditiously and economically produced.

Although the form of apparatus herein illustrated and described represents only one practical embodiment of the invention, it is to be understood that the invention is capable of other applications within the scope of the appended claims.

What is claimed is:

1. A method of making bulbs from glass tubing, which consists in first closing the end of the glass tubing by heat, and then lengthening the closed end of the tube by air pressure within the tube and confining the diameter of the extended portion to the same diameter as the tube, while leaving the lengthening closed end of the tube unconfined.

2. A method of making bulbs from individual lengths of glass tubing, which consists in advancing a tube, heating a portion of the tube to a plastic state to close an end thereof, applying a predetermined air pressure within the tube to extend the closed end thereof, and confining the diameter of the extended portion to the same diameter as the tube, while leaving the lengthening closed end of the tube unconfined.

3. In an apparatus for making bulbs from glass tubing, means for heating a portion of a tube to a plastic state to close an end thereof, means for applying an air pressure within the tube for a predetermined period of time to extend the closed end of the tube, and means for confining the diameter of the extended portion to the same diameter as the tube, while leaving the lengthening closed end of the tube unconfined.

4. In an apparatus for making bulbs from glass tubing, a conveyor for supporting and advancing the tubes, a heating element for reducing to a molten state and closing an end of each tube as it is advanced by the conveyor, means for extending the heated end of the tube, and means having an open ended bore therein of substantially the same diameter as said tube for receiving the molten end of said tube and confining the diameter of the extended portion to the same diameter as the tube, while leaving the lengthening closed end of the tube unconfined.

5. In an apparatus for making bulbs from glass tubing, a conveyor, means carried by the conveyor for receiving and supporting individual lengths of glass tubing, means for imparting an intermittent motion to the conveyor to progressively advance the tubes to successive positions, means for heating a portion of each advancing tube to a plastic state to close an end thereof, means for applying a predetermined air pressure within each tube to extend the closed end thereof, and a member having an open ended bore therein of substantially the same diameter as the tube for receiving the plastic end of the tube and confining the diameter of the extended portion to the same diameter as the tube, while leaving the lengthening closed end of the tube unconfined.

6. In an apparatus for making bulbs from individual lengths of glass tubing, a conveyor for supporting and intermittently advancing the tubes, heating means for reducing to a molten state and closing an end of each tube as it is advanced by the conveyor, means for applying a predetermined air pressure for a predetermined period of time within each tube to extend the closed molten end thereof, an open ended member having a bore for receiving the molten end of the tube and confining the diameter of the extended portion to the same diameter as the tube while leaving the lengthening closed end of the tube unconfined, and means for heating the member to prevent chilling of the heated tube when inserted therein.

In witness whereof, I hereunto subscribe my name this 26 day of January A. D., 1929.

CHARLES WALES.